United States Patent [19]
Young et al.

[11] Patent Number: 6,072,433
[45] Date of Patent: Jun. 6, 2000

[54] AUTONOMOUS FORMATION FLYING SENSOR

[75] Inventors: Lawrence E. Young, La Canada; Stephen M. Lichten, Pasadena; Jeffrey Y. Tien, Chino Hills; Charles E. Dunn, Pasadena; Bruce J. Haines, Pasadena; Kenneth H. Lau, Pasadena, all of Calif.

[73] Assignee: California Institute of Technology, Pasadena, Calif.

[21] Appl. No.: 08/999,828

[22] Filed: Jul. 31, 1997

Related U.S. Application Data

[60] Provisional application No. 60/023,301, Jul. 31, 1996.

[51] Int. Cl.[7] .................................. G01S 1/08; G01S 5/02
[52] U.S. Cl. ...................... 342/386; 342/357.08; 701/300
[58] Field of Search .............................. 364/460; 343/113; 455/13; 342/357.08, 357.11, 450, 386; 701/300

[56] References Cited

U.S. PATENT DOCUMENTS

| | | | |
|---|---|---|---|
| 4,384,293 | 5/1983 | Deem | 343/113 |
| 4,638,320 | 1/1987 | Eggert | 342/442 |
| 4,853,863 | 8/1989 | Cohen | 364/460 |
| 5,043,903 | 8/1991 | Constant | 364/460 |
| 5,810,297 | 9/1998 | Basuthakur | 244/176 |

*Primary Examiner*—Gregory C. Issing
*Attorney, Agent, or Firm*—Fish & Richardson P.C.

[57] ABSTRACT

An autonomous formation flying sensor for precise autonomous determination and control of the relative position and attitude for a formation of moving objects.

23 Claims, 12 Drawing Sheets

AUTONOMOUS FORMATION FLYING SENSOR

RELATED PATENT APPLICATION

This application claims the benefit of U.S. Provisional Application No. 60/023,301, filed on Jul. 31, 1996, the entirety of which is incorporated herein by reference.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to autonomous relative positioning and attitude determination for formation of objects.

BACKGROUND OF THE INVENTION

Autonomous relative positioning using electromagnetic signals between two or more objects is important in many applications. In a formation of a plurality moving members, precise determination of the relative attitude, the attitude rate, and the relative position is necessary. In certain formation applications, such determination may be achieved in real time or near real time. These high precision measurements may preferably be carried out automatically and reliably without human intervention or constant maintenance in order to meet requirements of specific applications and to reduce system operation cost.

For example, the Deep Space Mission 3 (DS-3) under the New Millennium Program (NMP) of the National Aeronautics and Space Administration (NASA) uses a separated spacecraft interferometry system (SSI) in deep space to obtain high resolution images. One particular architecture presently under consideration for SSI uses three spacecraft traveling in a triangular formation relative to one another to form an optical interferometer. One of the challenges is to devise a sensing system capable of autonomously maintaining the relative positioning and attitude of three spacecraft in a formation. Such a system should be low-power, low mass, and low cost.

In addition, the system should have a general architecture which would enable it to be used on a variety of different missions without significant re-engineering.

SUMMARY OF THE INVENTION

The inventors of the present invention recognized the needs for such autonomous relative positioning systems in deep space applications, aircraft related applications, and various terrestrial applications for both military and commercial use.

Importantly, the inventors recognized that many components in the technology of Global Positioning System ("GPS"), which have been developed exclusively for earth-orbiting satellite tracking and global positioning, can be adapted for many other applications. GPS receivers have proliferated well beyond the original vision of its system architects to provide various absolute measurements including transnational position, velocity, time, as well as attitude and attitude rate. New GPS receivers can routinely deliver highly accurate measurements for most of these state parameters. Thus GPS receivers hold the promise of satisfying nearly all the guidance, navigation and control ("GN&C") sensing requirements for Earth orbiting spacecraft in a single integrated, reliable, low mass, low volume, and low power package. Because the NAVSTAR GPS system was originally designed for Earth applications, usage in deep space was nonexistent.

An autonomous formation flyer ("AFF") sensing system may include a plurality of electromagnetic transceivers each attached to a member in a formation. At least one antenna is located on each member of the formation and connected to the transceiver to transmit and receive signals in communication with other members. This allows determination of the relative positioning and attitude of formation members with respect to one another in the formation.

An AFF transceiver may include a down-conversion assembly which demodulates the received signals to extract low-frequency data superimposed on a high-frequency carrier, a baseband processor which includes a CPU and one or more application-specific integrated circuits, and an up-conversion assembly which modulates the generated low-rate data for signal transmission. The baseband processor determines the delays of the received signals and therefore determines its relative positioning and attitude with respect to the transmitting AFF member. The results are then superimposed onto a high-frequency carrier by the up-conversion assembly and broadcasted to other members in the formation via a plurality of transmitting antennas. The carrier frequency of one AFF member may be frequency-shifted by a small amount relative to the carrier frequencies of other AFF members.

One aspect of the invention is determination of a relative range and attitude between formation members based on ranging codes embedded in the transmitted signals. The ranging codes are pulses in certain temporal sequences and may be generated by the application-specific integrated circuits in the transceiver. Ranging codes in GPS receivers may be used. Determination of the relative attitude may be achieved by implementing a plurality of receiving antennas on each formation member to measure the phase differences of received signals that are transmitted from an transmitting antenna on another formation member.

In another aspect a controlling system for the communication and detection transceiver continuously compares measured positions and orientations of the formation members with a set of desired values and initiates corrective sequences or maneuvers to maintain the desired formation configuration. An implementation may include one or more CPUs that are disposed onboard the formation or elsewhere.

Yet another aspect of the present disclosure is the capability of providing GPS measurements for earth orbit applications, aircraft related applications and ground applications. In particular, the AFF system of the invention may incorporate features of GPS receivers into the AFF transceivers or construct the AFF transceivers by modifying GPS receivers. This allows the AFF sensing system to track GPS satellites and process available GPS data in determining the absolute position and attitude of each formation member and improving the relative position and attitude solutions.

Yet another aspect of the present disclosure is the versatility of the communication and detection transceiver and the AFF concept. Applications using the AFF concept in accordance with the present invention include, but are not limited to, rendezvous and docking of spacecraft, formation flying in an Earth orbit, aircraft collision avoidance and formation flying, ground robotics vehicles, ship formation and submersible formations.

These and other aspects, and advantages of the present disclosure will become more apparent in light of the following detailed description, the accompanying drawings, and the claims.

DETAILED DESCRIPTION OF THE INVENTION

The AFF sensor according to one embodiment of the invention is an active sensing system disposed in a formation having two or more moving formation members in a certain geometric configuration. The formation members may be spacecraft, aircraft, motor vehicles, ships, or a combination thereof.

Each formation member has a plurality of antennas that transmit and receive electromagnetic signals. Preferably, more than two antennas may function as receiving antennas to form a receiving antenna array on each formation member. Similarly, more than two antennas may function as transmitting antennas to form a transmitting antenna array on each formation member.

Different array configurations are contemplated. For example, the receiving antenna array and the transmitting antenna may differ from each other by having different number of antennas, different antennas, or different array geometry; a receiving antenna in the receiving antenna array may also serve as a transmitting antenna in the transmitting antenna array; the two antenna arrays may also be identical to each other.

In the case where an antenna is used for both transmitting and receiving signals, corresponding receiving and transmitting circuits are both connected to the antenna in parallel. A scheduling mechanism may be needed such as a time multiplexing scheme so that the antenna could transmit and receive signals alternatively in the time domain.

The array geometry, i.e., the spatial distribution, of either the receiving or transmitting antenna is chosen to achieve an optimal spatial coverage in receiving or transmitting signals. For example, a formation member in an approximate cubic shape may have a total of six corner-located receiving antennas and two transmitting antennas mounted on two diametrically opposing corners.

Figure 1:
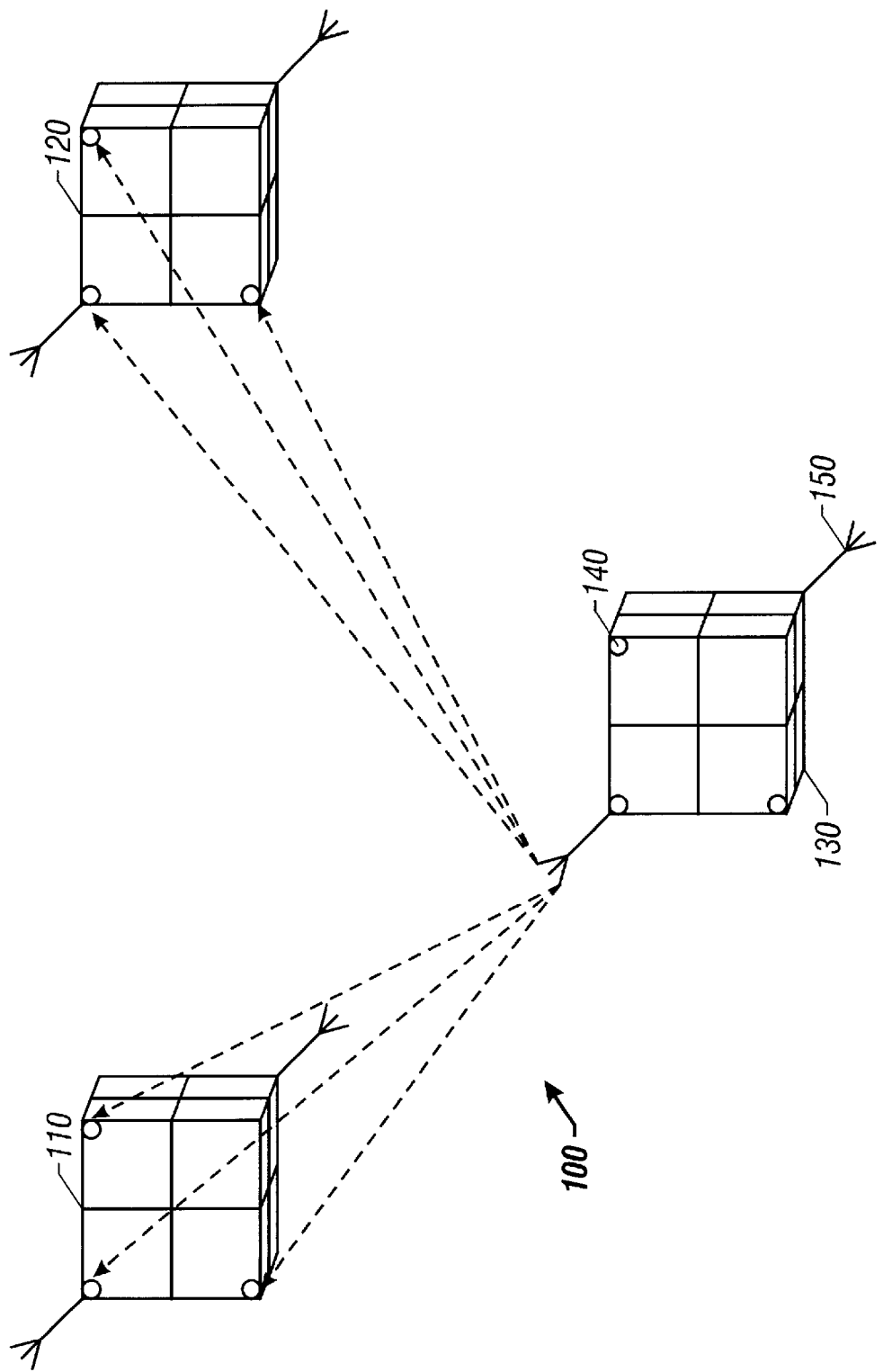
FIG. 1 is a diagram illustrating an exemplary triangular formation with three members.

FIG. 1 shows a formation 100 of three members 110, 120, and 130. Each formation member has two corner-mounted transmitting antennas 150 and six receiving antennas 140, three each on opposite facets of the spacecraft. The two transmitters 150 are mounted on diametrically-opposing corners. Such an antenna arrangement provides full coverage in all directions (i.e., $4\pi$ steradian), assuming hemispherical fields of view for each antenna.

An alternate, and perhaps a preferable approach for the three-member formation of FIG. 1, is to minimize the number of transmitting and receiving antennas by placing three receiving antennas on one face and only a single receiving antenna on the opposite face of the spacecraft. The single receiving antenna may have a wide field of view and could be used primarily for signal acquisition and initialization of the formation. In a routine tracking configuration, the single receiving antenna may be turned off and the triplet of receiving antennas on the opposite side could be used to actively track signals from other spacecraft. This design can reduce the number of receiving antennas 140 from six to four.

Figure 2B:
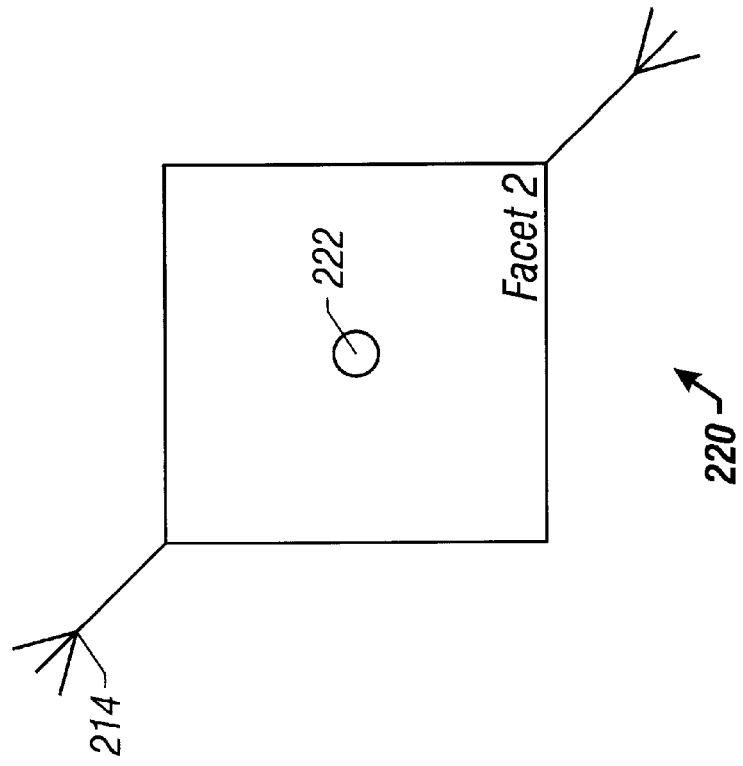
FIGS. 2A and 2B are schematic illustrations of a cubic AFF member with four receiving antennas distributed on two opposing facets and two diametrically located transmitting antennas.
Figure 2A:
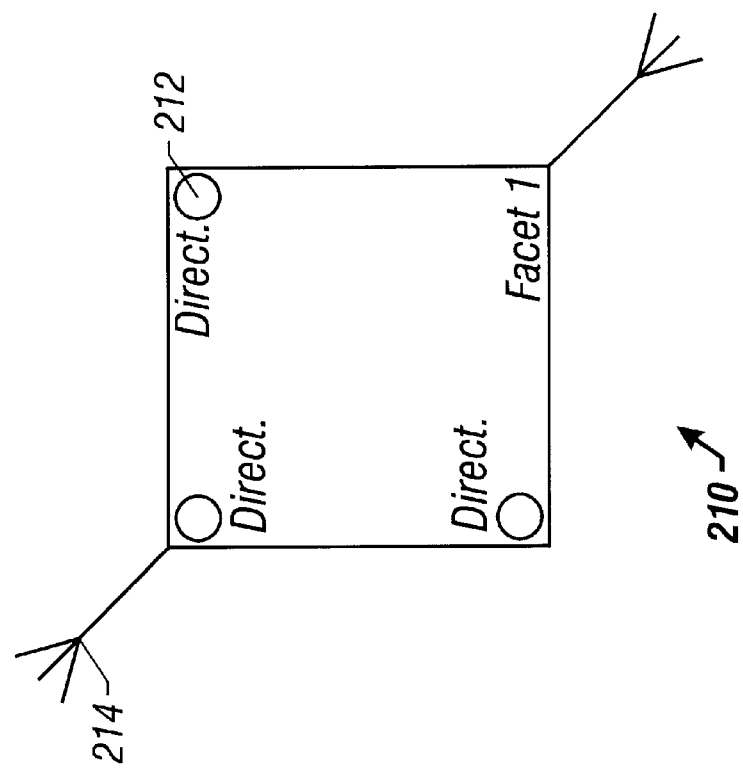

FIGS. 2A and 2B show one example of such an AFF member. Three receiving directional receiving antennas 212 are located on a single facet 210 (facet 1) to form a triplet and a single receiving antenna 222 is placed on an opposite facet 220 (facet 2). A directional antenna may have a field of view of about full hemisphere. Two additional transmitting antennas 214 are deployed at two diagonal corners of the AFF member. After the triplets of all AFF members face one another in a formation, relative attitudes can be uniquely determined and triangulation may be used to determine the position of an AFF member in the formation. Such a reduction in the quantity of antennas may be more feasible for formations of three members in form of an equilateral triangle (e.g., the DS-3 NASA mission). Alternatively, the facet 1 with the directional triplet may include a receiving antenna located at the center of the facet to further increase the field-of-view in the receiving signals. This would increase the number of receiving antennas to five.

For a more general formation or constellation in geometric configurations other than the triangular formation of three AFF members, however, additional receiving or transmitting antennas may be needed in order to provide fully autonomous $4\pi$-steradian viewing and tracking.

One element of the AFF sensing system is the AFF transceiver. This AFF transceiver generates the data to be transmitted to other formation members and processes the data transmitted from other formation members. Each formation member includes at least one AFF transceiver that is connected to both receiving and transmitting antenna arrays on the formation member.

Figure 3:
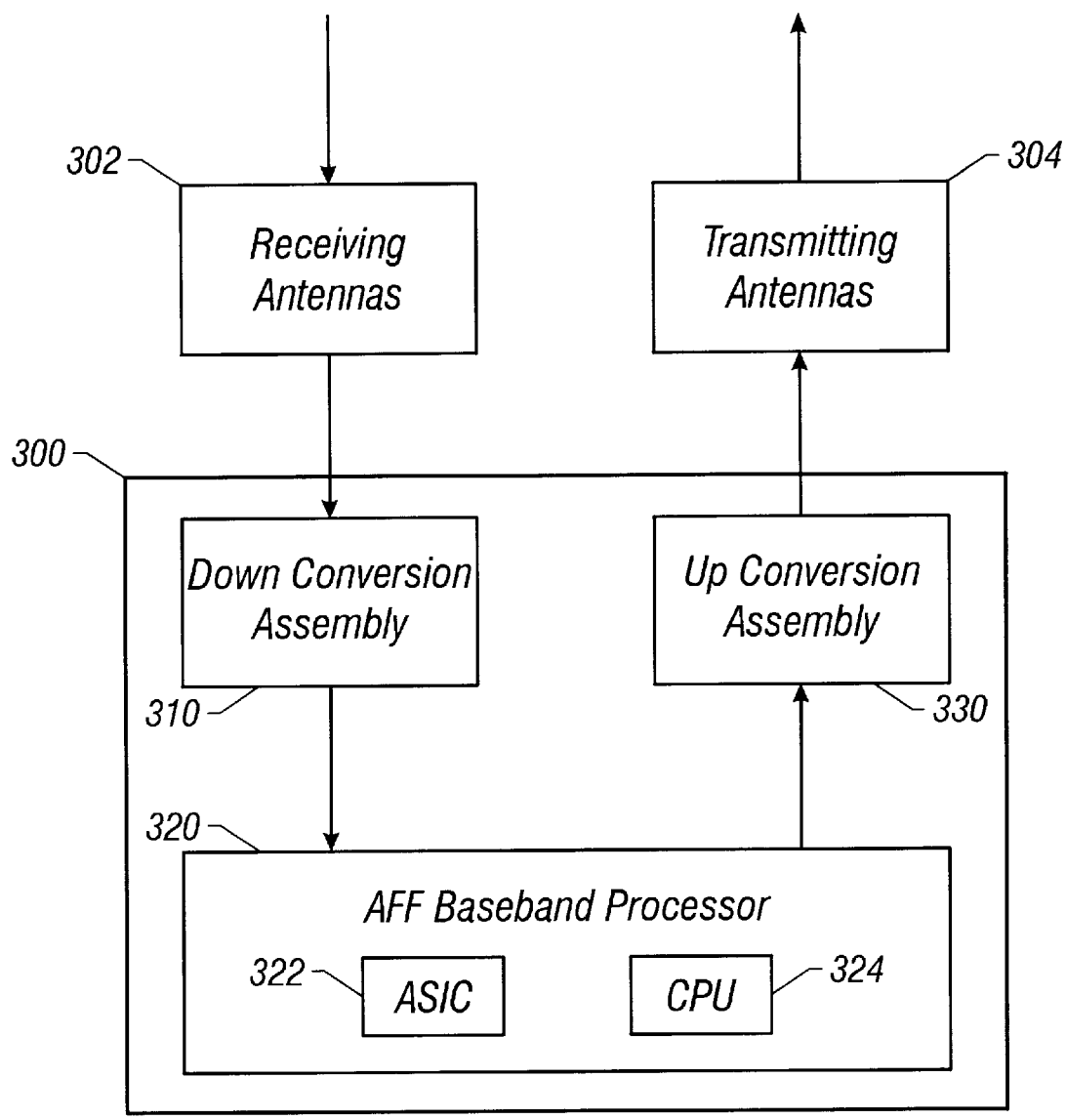
FIG. 3 is a block diagram showing a preferred AFF transceiver architecture.

FIG. 3 shows a block diagram of a preferred overall structure of the AFF transceiver 300 in accordance with the invention. The receiving antennas 302 in a certain spatial configuration on an AFF member (e.g., spacecraft) receive signals from other AFF members in the formation. A down-conversion assembly 310 demodulates the received signals to extract low-frequency data from a high-frequency carrier. The incoming data is then sent to a baseband processor 320 which includes a CPU 324 and one or more application-specific integrated circuits (ASIC's) 322. The baseband processor 320 determines the delays and phase information of the received signals and therefore determines its relative positioning and attitude with respect to the transmitting AFF member. Preferably, a transceiver communicates with all other transceivers in the formation and measure the range and phase data relative thereto. The measured range and phase data is then superimposed onto a high-frequency carrier by an up-conversion assembly 330 and broadcasted to other members in the formation via a plurality of transmitting antennas 304. The carrier frequency of one AFF member is usually frequency-shifted by an small amount relative to the carrier frequencies of other AFF members.

One aspect of the invention is combining additional communication data into the transmission. The phase and range data is the intrinsic AFF data that is needed in formation sensing and controlling. The inventors recognized that other non-AFF data may be incorporated into the transmission signal. For example, conventional telemetry data in many satellite communication systems often use a designated communication link. In the AFF sensing system, telemetry can be multiplexed with the range and phase data so that the AFF transmission channel is also a communication channel for telemetry. In addition, depending on the available transmission bandwidth, any other information or data may also be included in the AFF transmission. For example, control commands, scientific and engineering data may be transmitted in the AFF signal along with range and phase data. Furthermore, additional channel with a different frequency may be used to increase the bandwidth of the AFF transmission.

Another component of the AFF system is the AFF controller which includes at least one CPU. The AFF controller communicates with every AFF transceiver to receive "reporting" data therefrom. The AFF controller determines the instant formation configuration based on the data from the AFF transceivers on the AFF members and compares the measured configuration to a desired configuration. If the measured configuration deviates from the desired configuration, the AFF controller generates an appropriate correction instruction to instruct one or more formation members to adjust the relative position or attitude with respect to other AFF members so that the deviation is substantially minimized. Various AFF software packages may be used to program the AFF controller with different functions such as ranging code generation, Kalman-type filtering and estimation, and optional GPS tracking and processing.

The AFF controller may be implemented in a number of configurations. In one embodiment, the AFF controller may physically locate within the AFF formation. This "onboard" configuration may take several forms. For example, the entire AFF controller may reside on a single AFF member. For another example, the AFF controller may have a plurality of CPUs which are distributed on two or more AFF members. One possible variation of the second example is that the AFF controller is a collection of the CPUs within the AFF transceivers and each CPU independently determines the formation configuration and generates correction instructions for the AFF member on which it resides.

Another configuration could locate the AFF controller outside the formation. For example, in a spacecraft formation near the Earth, the AFF controller may be placed at a ground station or on a spacecraft that is not part of the formation.

The AFF sensing system of the invention may measure a number of parameters, including but not limited to, range between any two formation members, relative attitude, the relative attitude rate, and optionally the absolute positioning of each formation members. One way to perform these measurements uses ranging codes which are pulses in certain temporal sequences. For a given ranging code, the temporal sequence is fixed. Hence, if a signal encoded with the given code is transmitted from a first AFF transceiver and is later received by a second AFF transceiver, the received signal at the second transceiver is delayed in the time domain by a duration that the signal travels between two AFF transceivers. If the clocks of the two AFF transceivers are assumed to have no clock offset, the range between the two AFF transceivers can be determined by multiplying the speed of light by the time delay. This time delay can be determined by correlating the received signal at the second AFF transceiver and the given range code in the time domain. This correlation technique is well known in the art. Specifically, a correlation signal is maximal if the received signal is time-shifted by the time delay in a direction to overlap the given ranging code.

Since the clock offset is usually not zero, the range so obtained is not the actual range between the AFF transceivers and therefore is called "pseudo-range". The clock offset is undesirable and can be determined or compensated to achieve the actual time delay. This will be further described in detail.

In addition to range, the relative attitude of one formation member with respect to another in the formation is also needed. This can be determined by measuring the carrier phase using the small baseline receiving antenna array. Since the receiving antennas are located at different positions in the receiving antenna array, a signal from a transmitting antenna of another formation member experiences different phase delay at different receiving antennas. The phase differences of received signals can be measured and therefore the orientation of the receiving antenna array with respect to the transmitting antenna can be determined. The relative velocity and attitude rate (i.e., the relative rotation rate) can be determined by using known methods that are widely used in the GPS applications.

The AFF controller receives the measured data from all AFF transceivers and merges the data into a least-square processor which is essentially a real-time extended Kalman-type filter/estimator. The geometry of the formation, i.e., the "constellation", could be obtained for the relative vectors between all formation members and their relative orientations. If actual GPS data are being tracked in addition to the data encoded with the ranging code, using the GPS data may expedite processing cycle of the AFF controller.

According to one embodiment, the AFF sensing system may be designed to enable the formation to self-track in an autonomous manner from arbitrary initial orientations. The AFF controller continuously compares the measured positions and orientations with the desired values and operates to initiate corrective sequences or maneuvers in order to maintain the target ensemble configuration. This allows the AFF sensor to provide true autonomy for the formation because changes in relative positions and orientations of the multiple spacecraft could be effected automatically by the AFF controller.

Various aspects of the AFF sensor are in part based on several innovative uses of GPS tracking techniques although the AFF sensor may not require actual tracking of the GPS satellites. For example, a GPS receiver can be modified and converted into an AFF transceiver similar to the embodiment 300 shown in FIG. 3. The cost of AFF hardware can be significantly reduced by exploitation of the existing space GPS receiver technology. These receivers are inexpensive and will soon be commercially available. If ordered in quantity, the recurring hardware cost per space flight unit may fall below about $100,000. Units for use at the Earth's surface could be more than a factor of ten less costly than those used in space missions. Non-recurring engineering that may be needed can include the transmission capability, the software for dual one-way data processing, accommodations for multiple antennas, software for relative positioning and orientation, integrity monitoring, Ka-band capability (instead of L-band), and the interface for spacecraft control subsystem.

A GPS receiver suitable for the invention preferably includes flexible software and hardware to generate models of GPS ranging codes and carrier phase. These models can be correlated with incoming NAVSTAR GPS data and enable precise pseudorange and phase observables to be measured. As an example, a TurboRogue GPS receiver, can be modified to construct an AFF transceiver. The TurboRogue GPS receiver was originally developed at Jet Propulsion Laboratory (JPL) for precise positioning and timing applications, and is currently commercially available from Allen Osborne and Associates. Features of the TurboRogue GPS receiver that was modified by the inventors to demonstrate a special AFF system are described. A more detailed description of the TurboRogue GPS receiver can be found, for example, in "The TurboRogue GPS Receiver" by T. Meehan et al. in the Proceedings of the sixth International Geodetic Symposium on Satellite Positioning, Columbus, Ohio, 209–218, March 1992; and "Signal-Processing Theory for the TurboRogue Receiver" by J. Thomas in JPL Publication 95-6, both of which are incorporated herein by reference.

A GPS receiver may be modified and incorporated with new features so that it essentially is converted into an AFF transceiver for AFF applications. The internally generated GPS ranging code models by the GPS receivers or other functionally similar GPS-like models can be used for a one-way beacon transmission. Processing of the received data, which could be GPS data or GPS-like data, proceeds in a manner similar to data processing in a conventional GPS receiver.

Thus, ranging code models suitable for the AFF of the invention may be generated in a number of ways. One approach uses actual GPS signals for constellation formation and control of an AFF system. See, Spilker, "GPS Signal Structure and Performance Characteristics" in "GPS, papers published in Navigation", pp. 29–54, Institute of Navigation, Washington D.C. (1980). Since the actual GPS signals are designed for certain less accurate military applications, accuracy at the cm-level may not be easily achieved by directly using the GPS signals. Additional processing known in the art may be used to improve the accuracy.

Another approach for generating the AFF ranging code models uses pseudo-random noise (PN) codes to produce "GPS-like" signals. Many existing PN-code schemes may be used in the present invention and the actual implementations are dependent on the operating frequency and the bandwidth allocated for an AFF.

Yet other types of data having information similar to that in the GPS models may include, but are not limited to non-GPS spread spectrum signals and spaced raging tones.

In particular, spaced tones at different frequencies may be used to resolve certain range ambiguities and achieve a precise range measurement.

The spaced ranging tones are based on a bandwidth synthesis technique similar to that used for Very Long Baseline Interferometry. Range can be determined by using suitably spaced tones. The phase $\phi$, carrier frequency f and time delay t between signal transmission and receiving are related by $\phi=ft$. When the frequency or "tone" of the carrier frequency changes by an amount $\Delta f$, the phase $\phi$ will change accordingly by an amount $\Delta\phi$. The time delay t thus can be computed according to $t=\Delta\phi/\Delta f$.

Therefore, so long as the clock offsets on the transmitter and the receiver can be precisely calibrated or measured and the phase values of two carriers with known frequencies can be measured without introducing instrument phases, the time delay t can be recovered. As a result, the range can be determined by multiplying the t by the speed of light. A technique of measuring clock offsets in two-way signals will be described with reference to FIG. 6, infra.

One implementation of AFF sensor is to modify a GPS receiver (e.g., the TurboRogue or some other types of space receiver) into a transceiver that is capable of both transmitting and receiving signals. A GPS receiver may be modified to include a transmitting channel in its circuits to generate and transmit signals via one or more transmitting antennas. Accordingly, the signal processing and communication circuits in the GPS receiver may also be modified and the respective GPS instructions may be replaced by special AFF control instructions or software. Instead of tracking GPS satellites, the modified GPS receivers, i.e., AFF transceivers, track one another within a formation. Each member of the formation carries at least one such transceiver for dual one-way tracking. It may be useful to use a Ka-band frequency (instead of the usual GPS L-band frequency) to enable more precise tracking and to avoid any possible conflicts with the operations of a GPS constellation if the AFF is used near the Earth. The AFF design is flexible and can accommodate different frequencies in different applications.

Another GPS technology that can be implemented in the AFF sensing system is the GPS "Omni" patch antennas which are directional antennas with a wide field of view. Omni antennas can be made quite small (e.g., a mass on the order of 100 grams) and inexpensive (e.g., several hundred dollars per unit). The Omni antennas have been successfully tested in space.

Some of the stringent requirements in GPS applications may become unnecessary in the AFF sensing systems. For example, the onboard requirement for a stable clock in the AFF sensor is not as stringent as in the GPS because the transmission and reception of the dual one-way range and phase observables are nearly simultaneous in the AFF applications. This further simplifies the AFF sensor and reduces the cost.

The inventors constructed and tested a special AFF sensing system for a sub-nanosecond dual one-way time transfer over intercontinental distances on Earth and for AFF applications. This time transfer investigation utilized pairs of modified TurboRogue GPS receivers as the AFF transceivers to transmit and receive signals to each another. A special circuit board suitable for AFF applications was built and measurements were successfully made.

Figure 4:
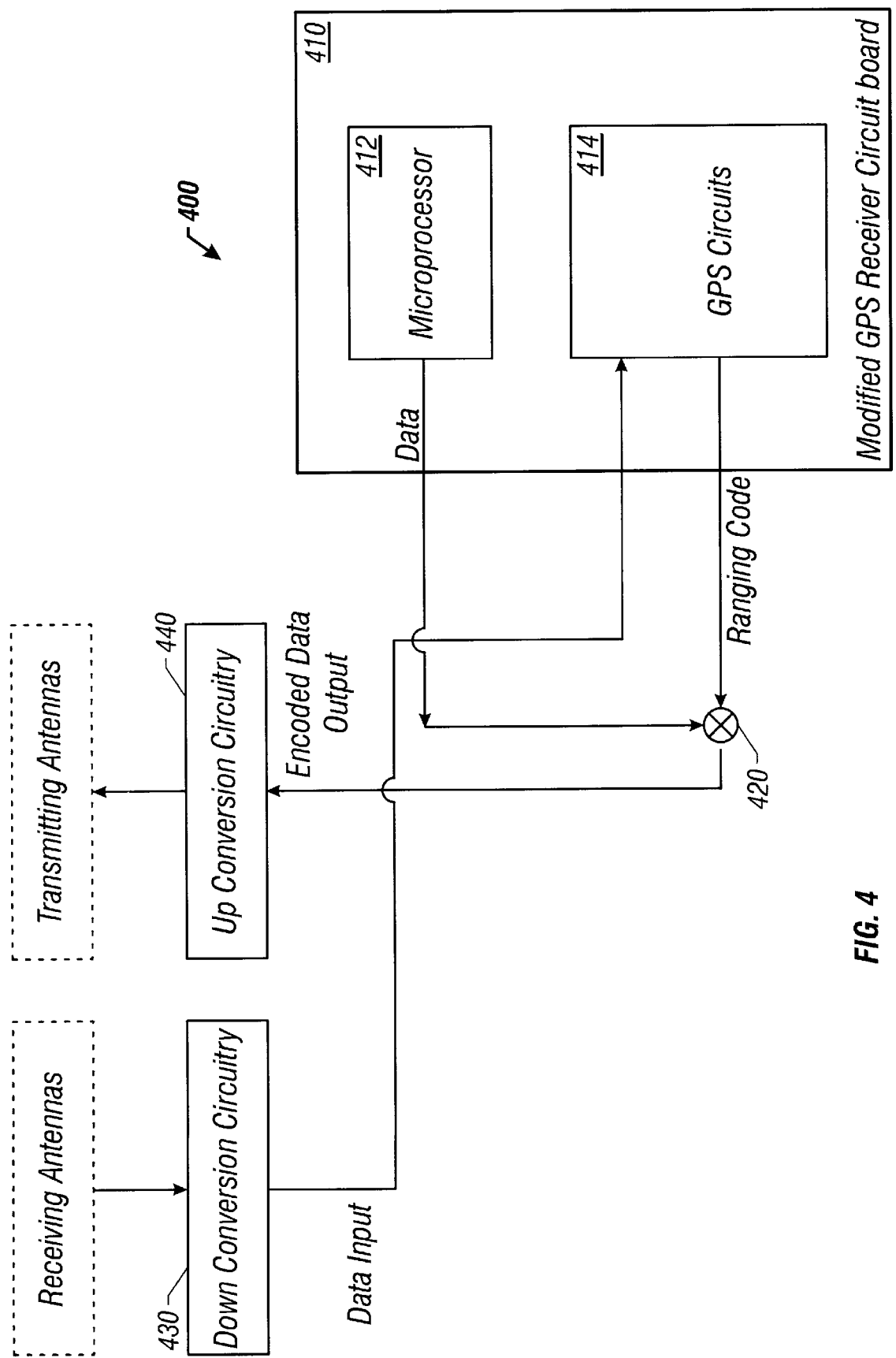
FIG. 4 is a schematic illustration of one embodiment of the AFF transceiver based on a modified TurboRogue GPS receiver.

FIG. 4 shows functional blocks of a special AFF transceiver 400 based on a modification of the TurboRogue GPS receiver. A modified GPS receiver circuit 410 includes a microprocessor 412 and GPS circuits 414. The processor 412 (e.g., a 29000 RISC processor) extracts delay information from the input signals and generates data. The GPS circuits 414 are used to perform several functions, including but not limited to, generating local ranging codes, correlating local codes and remote codes, and correlating local codes and delayed local codes. The low-rate data from the processor 412 and the ranging code from the GPS circuits 414 are mixed by a digital signal mixer 420. An up-conversion circuit 440 is added for transmitting signals to other members in the formation.

Figure 5:
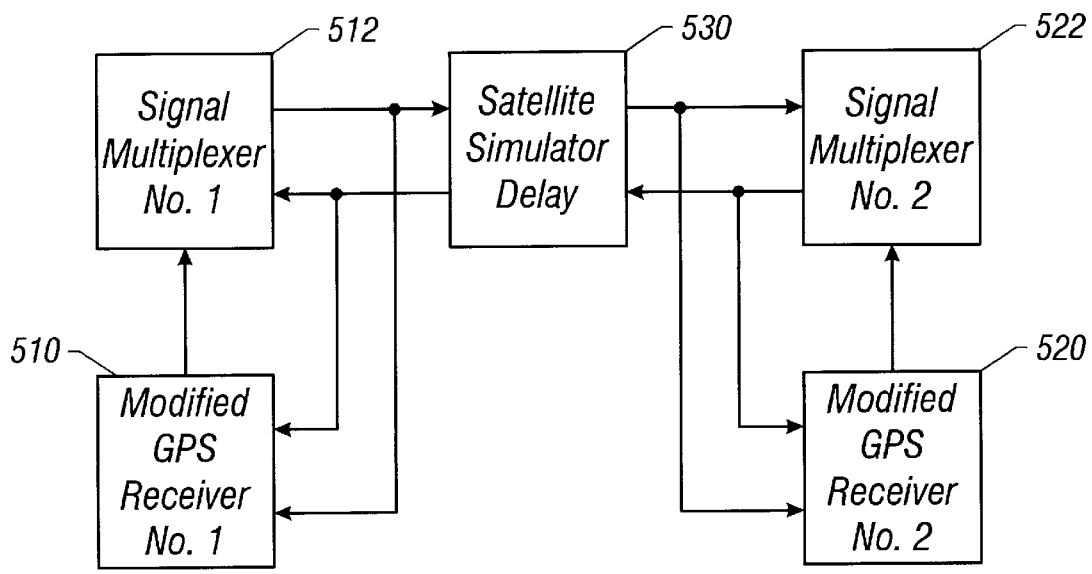
FIG. 5 is a block diagram of the two-way time transfer system for testing the AFF transceiver of FIG. 4.
Figure 6:
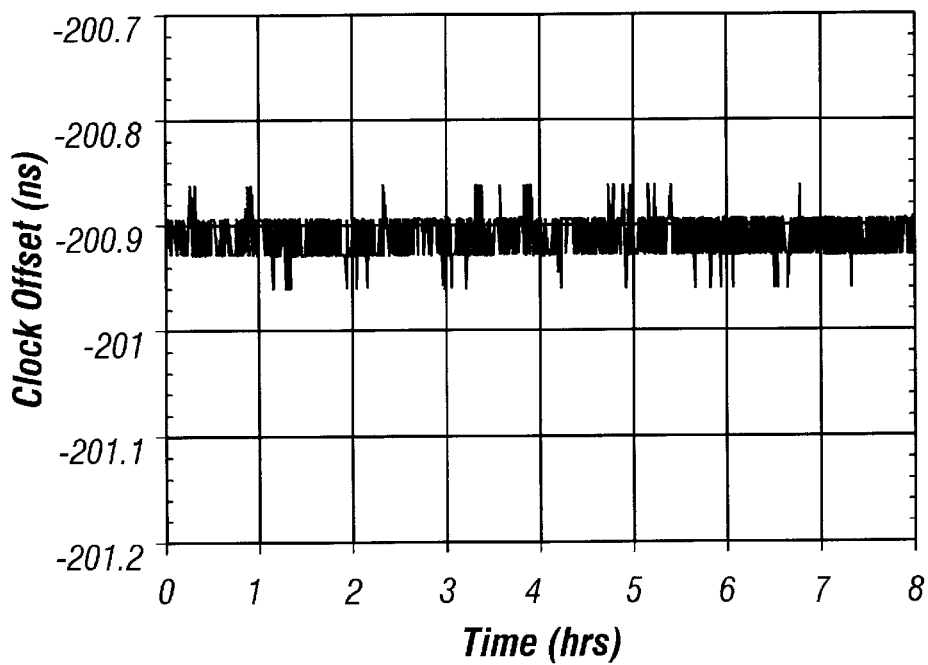
FIG. 6 is a chart showing the measured clock offset in testing two AFF transceivers as shown in FIG. 5.

FIG. 5 illustrates the test setup 500 with two transceivers 510 and 520 constructed as shown in FIG. 4. The signal delay was simulated with a satellite simulator 530. FIG. 6 shows actual measurements of clock offsets from the setup 500. The RMS scatter about the mean is approximately 0.02 nanosecond, which corresponds to about 6 mm in range.

The dual one-way time transfer system of FIG. 5 simulates the operation of an AFF sensor in many respects. For example, no actual GPS satellites are tracked; instead, each modified GPS receiver "tracks" signals from other receivers. Each modified GPS receiver also functions as a transceiver. It should be noted that the stimulation setup for the time-transfer in FIG. 5 included components that may not be needed for the AFF applications, e.g., two multiplexers 512 and 522 and a simulated satellite 530. The AFF operates with two modified GPS receivers transmitting and receiving each others' signals directly. This configuration is able to provide measurements comparable in consistency to those shown in FIG. 6.

Figure 7:
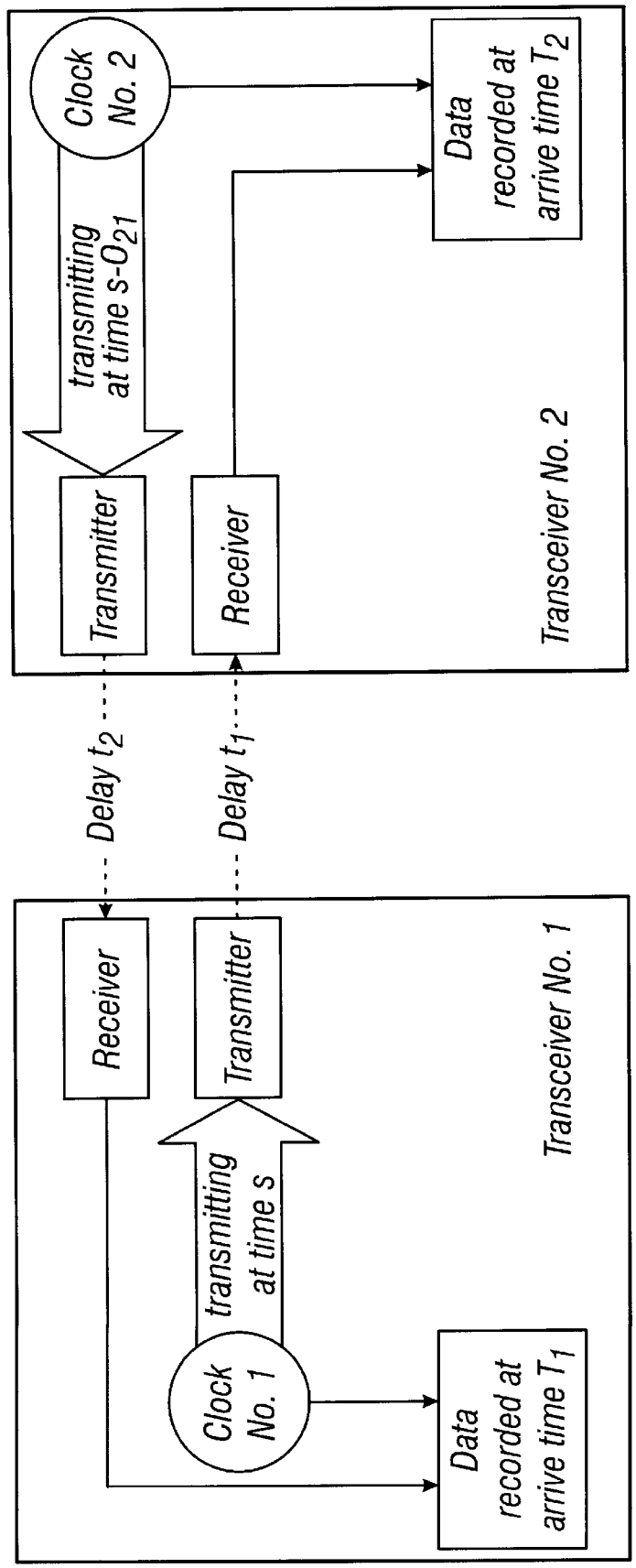
FIG. 7 is a diagram illustrating the clock offset determination between two AFF transceivers.

When two AFF sensors are used for self-tracking, each can send out a one-way signal and simultaneously receive a one-way signal from the other. The combination of these two one-way signals can be used to uniquely determine the clock offset and distance between the two AFF sensors. FIG. 7 shows an implementation of this process between two transceivers. Each transceiver has its own clock. Each of the two transceivers is programmed to transmit a one-way signal to the other at a specified time according to the "local" time. Since the two clocks may have an offset relative to each other, the transceivers may not transmit the one-way signals simultaneously. If the clock offset of the second transceiver with respect to the first transceiver is $O_{21}$ and the first transceiver sends out a one-way signal at time s, the time at which the second transceiver sends out the signal to the first transceiver is $(s-O_{21})$. The times for the transceivers receive the one-way signals from the other are:

$T_1 = s + t_2 - O_{21}$, $T_2 = s + t_1 + O_{21}$, where $t_1$ and $t_2$ are the time delays for signal transmission from the first transceiver to the second and from the second to the first, respectively. If the delays $t_1$ and $t_2$ are equal, the clock offset $O_{21}$ is simply given by $(T_2-T_1)/2$. If the measurement is formed as a sum $(T_1+T_2)$, the effect of the clock offset $O_{21}$ cancels.

Based on preliminary studies which assume 2 m diameter spacecraft and transmitting at the Ka-band frequency, an AFF system can provide information on the relative attitude with an accuracy better than ±1 arc-minute each second using the carrier phase data. An accuracy to about 1 cm in the relative spacecraft position may be achieved with the AFF sensor.

Figure 8:
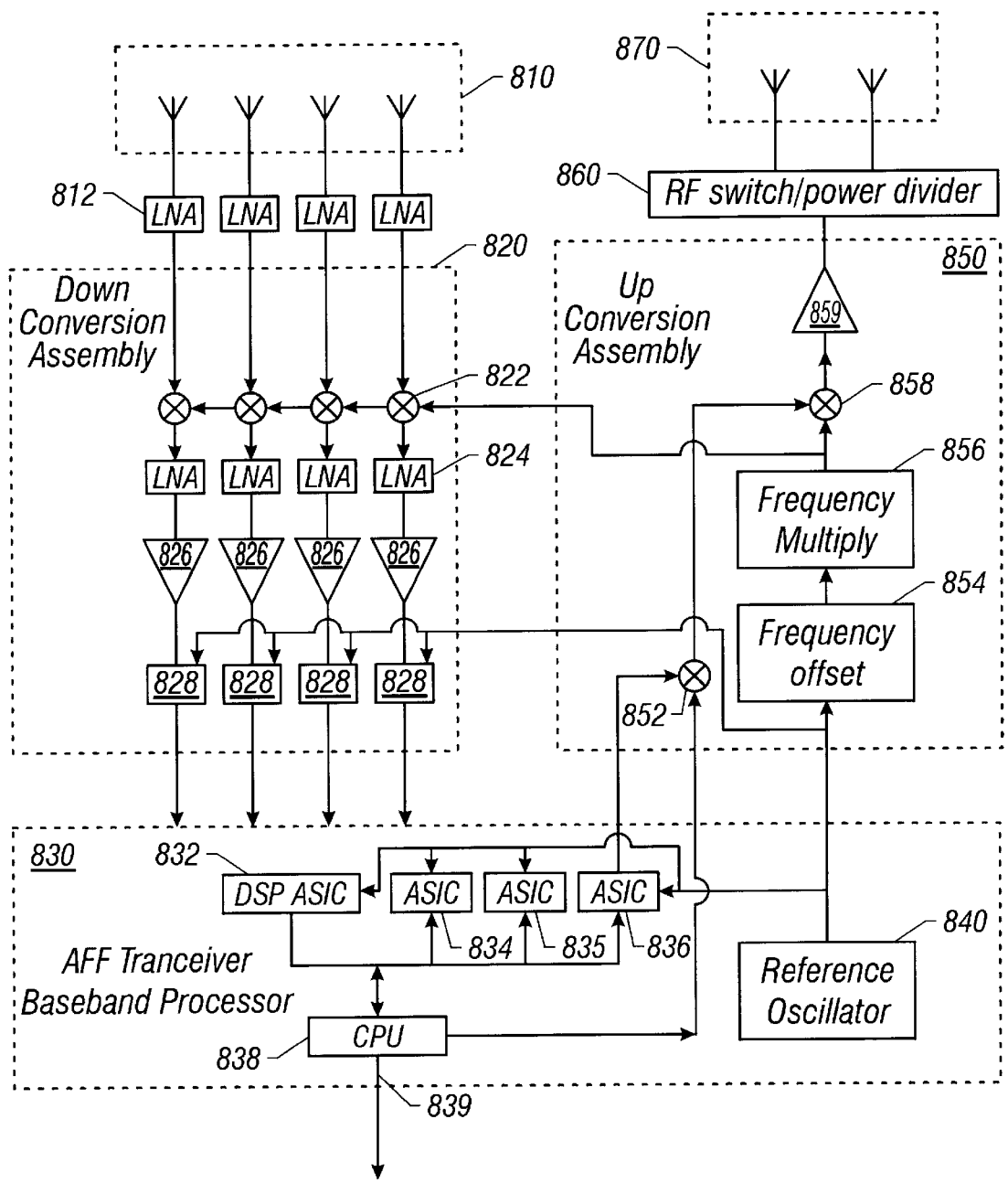
FIG. 8 is a block diagram showing an implementation of the AFF transceiver of FIG. 7.

Another embodiment 800 of the AFF transceiver of the invention is illustrated in FIG. 8. A plurality of receiving antennas are arranged with respect to one another in a receiving antenna array 810 to receive signals from other AFF members in the formation. A line amplifier 812 is connected to each receiving antenna to amplify the received signal. The down-conversion assembly 820 has a number of processing channels. Each channel corresponds to a receiving antenna. Each down-conversion channel includes a signal multiplexer 822, a low-pass filter 824, a RF amplifier 826, and an A/D sampler 828. A reference oscillator 840, e.g., a quartz oscillator at about 20 MHZ, may be used as a local frequency reference. The frequency range of the oscillator 840 may be from about 10 MHZ to about 100 MHZ. A modulation frequency preferably unique to each AFF member is used in both down-conversion assembly 820 and up conversion assembly 850. A frequency offset device 854 connected to the output of the reference oscillator 840 generates a frequency shift which is small compared to the frequency of the reference oscillator. Typically, the frequency offset is about several percent of the final transmitting carrier frequency. For Ka-band, this frequency offset may be about several MHZ. Thus, all AFF members of the formation transmit in the same band with slightly offset frequencies. A frequency multiplying device 856 increases the clock frequency to a desired carrier frequency for transmission.

A digital-signal-processing ("DSP") ASIC 832 may be implemented at the receiving end of the baseband processor. The sampled signals from the down-conversion assembly are processed by the DSP ASIC and a plurality of other ASICs to prepare the data for final processing by a CPU 838 in the processor. Each ASIC may be configured to simultaneously track a plurality of antennas (e.g., signals from 12 antennas). The CPU 838 extracts the delay information and generates the relative range and direction data with reference to the AFF member from which is the signal is transmitted. The data transmitted from each AFF member includes measured phase and pseudo-range data. Carrier phase is used to track changes in range. The absolute range can be determined by the long-term average of pseudo range data with a precision at about 1 cm. The relative orientation or direction of another AFF member is determined by using carrier phase differences detected at each of the receiving antennas.

The output data from the CPU 838 is processed at two stages prior to transmission. First, the data is mixed with PN-codes generated by one of the ASICs (e.g., ASIC 836) through signal multiplexing by a digital mixer 852 to produce encoded data. Second, the encoded data is superimposed onto a high-frequency carrier signal from the frequency multiplying device 856 for transmission. This is done by using an analog mixer 858. A power amplifier 859 amplifies the signal and a RF switch or a power divider 860 distributes the signal to the transmitting antennas 870. Optionally, the data from the CPU 838 can also be sent out by an additional channel 839 such as an RS-422 interface to the AFF controller or other signal processing units.

Another embodiment uses an integrated multi-module GPS transceiver optimized to enclose the baseband processor and the up- and down-conversion assemblies in a single compact package. One embodiment may include five interconnected modules: a receiver module which essentially includes the down-conversion assembly, an ASIC module having a plurality of ASICs, a microprocessor, a memory module, and a transmitter module which essentially includes the up-conversion assembly. The receiver module may include at least one receiving channel which may have a bandpass filter, an amplifier, a signal mixer and a buffer logic. For GPS applications, two receiving channels with slightly different carrier frequencies in the L-band may be implemented to minimize the ionosphere errors. The ASIC module can have one or more ASIC components each performing a GPS or AFF function. For example, the relative position and attitude of an AFF member can be computed with the ASIC module based on the received signals. The microprocessor may include a CPU, an instruction memory, a data memory and communication channels with an external computer.

The autonomous controls algorithm for the constellation control and formation flying may include two types of control architecture: a master-slave control configuration and decentralized control configuration.

The master-slave control configuration assumes that a given spacecraft, i.e., a slave member of the formation, performs a formation adjustment with respect to another spacecraft (i.e., the master member). This control architecture may be beneficial when the number of members in a formation is relatively small.

The decentralized control configuration assumes that all spacecraft will perform an formation adjustment to maintain the constellation. The control protocols for the decentralized configuration can be very complex in order to maintain the formation stability and to avoid adverse conditions such as duplicate spacecraft firings.

The AFF sensing system allows the formation to autonomously self orientate and self track from any initial configuration. This is in part due to the full-sky coverage of receiving and transmitting antenna arrays on each formation member (i.e., $4\pi$ steradian field-of-view). Position and attitude solutions for the formation can be exchanged through the same radio links established for tracking, so that constellation internal geometry, relative orientation, and integrity can be autonomously monitored by the AFF sensing system. The AFF sensing system also allows the maneuvers to be automatically sequenced and executed. Ground commands usually are not needed for formation operation.

The state parameters of the formation configuration, such as relative range, relative attitude, relative attitude rate and optional absolute positioning and attitude based on GPS data ("Solutions"), may be rapidly generated onboard one or more spacecraft using a continuously running factorized Kalman-type filter in much less than one second after real-time. This allows for the real-time knowledge to be inferred from propagated spacecraft states. The inventors have successfully tested the design and use of such continuously running filters in other GPS application contexts. In addition, the solutions can be incorporated into the spacecraft guidance-and-control attitude filter so that the filter can be folded with other attitude sensors to control the individual spacecraft attitude as well as the constellation. The AFF sensor may be configured to carry telemetry among spacecraft in the constellation.

A formation can be controlled and maintained with high precision with the AFF sensing system. It is estimated that the relative positioning of the AFF constellation can be measured with an accuracy to about ±1 cm, the relative velocity to about ±0.1 mm/s, and the attitude to about ±1 arcminute.

Furthermore, the needed transmitting power may be limited to less than about 0.1 watt while still allowing for precise tracking up to separations of about 1300 km. The total power required by the AFF may be between about 1 Watt and about 25 Watts, depending on the number transmitting and receiving antennas and the required accuracy. The mass of each AFF transceiver may be reduced to less than 2 kg.

One optional feature of the AFF sensing system is GPS capabilities. The AFF transceivers and the controller may be configured to track GPS satellites under certain conditions if the GPS satellites are visible to the formation. The GPS data is tracked and processed in addition to the relative range and phase observables transmitted by other vehicles in the constellation. The GPS data can be used to determine the absolute position and velocity.

Figure 9:
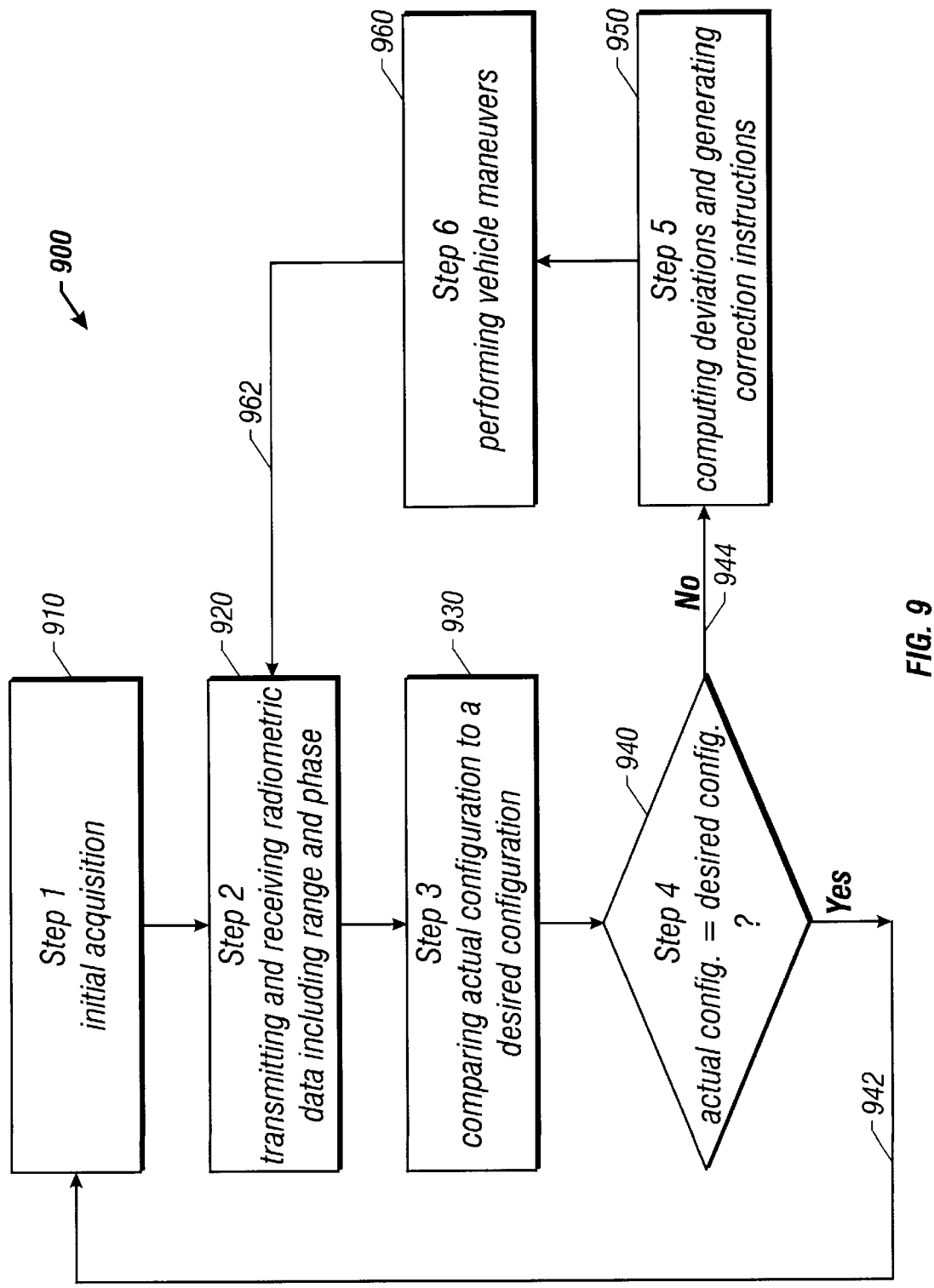
FIG. 9 is a flowchart of a preferred operation procedure of the AFF sensor of the present invention.

One preferred operation procedure for the AFF sensing system is shown in a flowchart of FIG. 9. This may be applied to formation operation for space applications, airborne flying formation applications and terrestrial formation applications.

At step 910, an AFF initial acquisition is carried out. A constellation of multiple vehicles (such as spacecraft launched into Earth orbit, or interplanetary space) may move in arbitrary directions, with somewhat arbitrary relative orientations. Each vehicle may have a simple timekeeping mechanism (e.g., a clock) to maintain an approximate time until the constellation maintains close relative tracking and control. At a specified time, each vehicle may broadcast a signal into a full $4\pi$ steradian solid angle. For example, the systems shown in FIGS. 1, 2A and 2B have two directional transmitting antennas on each vehicle. Broadcast signals include radio metric data including range and phase and a small amount of telemetry. The telemetry can initially, for example, include simply a vehicle identification code. A detailed description of this initial acquisition will be described.

At step 920, the AFF sensing system continues to exchange data between formation members and track the state of the constellation. Each vehicle broadcasts a small amount of telemetry which includes its identification code. This allows each vehicle to be identified and registered in the AFF constellation. The transmission signals may include range and phase data along with the transmitter ID code. The broadcast signal is received by a vehicle having one or multiple antennas. Reception with multiple antennas enables estimation of the relative attitude. Each vehicle tracks the signals that are being received and the antennas are being used for receiving the signals. If GPS satellites are to be tracked as well, those signals are also acquired at this time much as a conventional GPS receiver would do.

Continuous phase and range data are collected and stored. Short breaks might be anticipated when changing over from different receiving antennas due to relative motion or rotation of transmitters and receivers.

One of the vehicles (for constellation maintenance and control) may be designated to carry the AFF controller. As described previously, other data processing configurations may also be used. For example, an alternate scheme would allow more than one vehicles to carry out their own independent calculations. The central processor configuration is used herein to illustrate the invention. Each vehicle is able to identify which of the other vehicles is the central processor unit through unique ID codes. Each vehicle transmits its received tracking data through telemetry links to that central processor unit.

The AFF controller is operable to track other vehicles in the constellation with the receiving antennas on the host vehicle. The AFF controller may also receive the time-tagged tracking data through telemetry from all other vehicles. All these data may be merged into a least-square processor which is essentially a real-time extended Kalman-type filter/estimator. Thus a solution could be obtained for the relative vectors between all vehicles and their relative orientations. If actual GPS data are being tracked (in addition to the GPS-like data from the vehicles in the constellation), the inclusion of such data can expedite the initial solutions and their convergence.

At step 930, the AFF sensing system carries out computation of difference between observed and desired formation states. The AFF controller can store one or more predetermined desired constellation configurations or receive new configuration commands from a ground station or other sources.

If the deviation of the actual formation configuration from a desired configuration exceeds a predetermined threshold value, a set of correction instructions are generated to change the current constellation to minimize the deviation. This is shown by loop 944, steps 950 and 960. More specifically, an optimal set of maneuvers can be computed based on the deviation and control the vehicle maneuvering systems to bring the constellation into the desired state.

Based on the size of the maneuvers and the desired error tolerance, a decision may be made on which maneuvers are performed by the individual vehicles. These could be implemented one at a time, or all together. Commands can be broadcast from the central controlling vehicle instructing the other vehicles to maneuver at specific times.

The AFF controller sends commands to the other vehicles and they execute the commanded maneuvers. A command may involve thrusts to move the entire vehicle in a specified direction, or simply to rotate it. An optimal schedule for the maneuvers can be computed by the central control CPU or the processor on each vehicle, some maneuvers may be simultaneous, others may be phased in a particular order.

Upon completion of the maneuvers, the AFF sensing system is instructed to go back to step 920 (loop 9623) to continue tracking and transmitting data within the formation.

If the AFF sensing system decides that the measured constellation configuration satisfactorily match the desired configuration (e.g., the deviation is less than the threshold value), the system will follow the loop 942 back to step 920 to continuous transmitting and receiving radiometric data.

In the event of a cold start/restart or a significant maneuver or change to the constellation configuration at any point during the operation, the AFF sensing system may restart another initial acquisition.

The AFF initial acquisition of step 910 is of particular importance since this step establishes initial communication among AFF members. Prior to establishing normal AFF, the AFF members are often in a possibly chaotic state with respect to one another. The AFF initial acquisition allows all AFF members to establish mutual communication links and form a necessary initial flying formation for subsequent AFF operations.

The initial acquisition accomplishes at least the following steps. First, each AFF member is reorientated in a search for signals from other members while simultaneously transmitting signals to others. Secondly, the communication among all AFF members is established and positioning measurements of the AFF members are exchanged in the AFF formation. Thirdly, a positioning control loop is activated to track the positioning and orientation of each AFF member.

Figure 10:
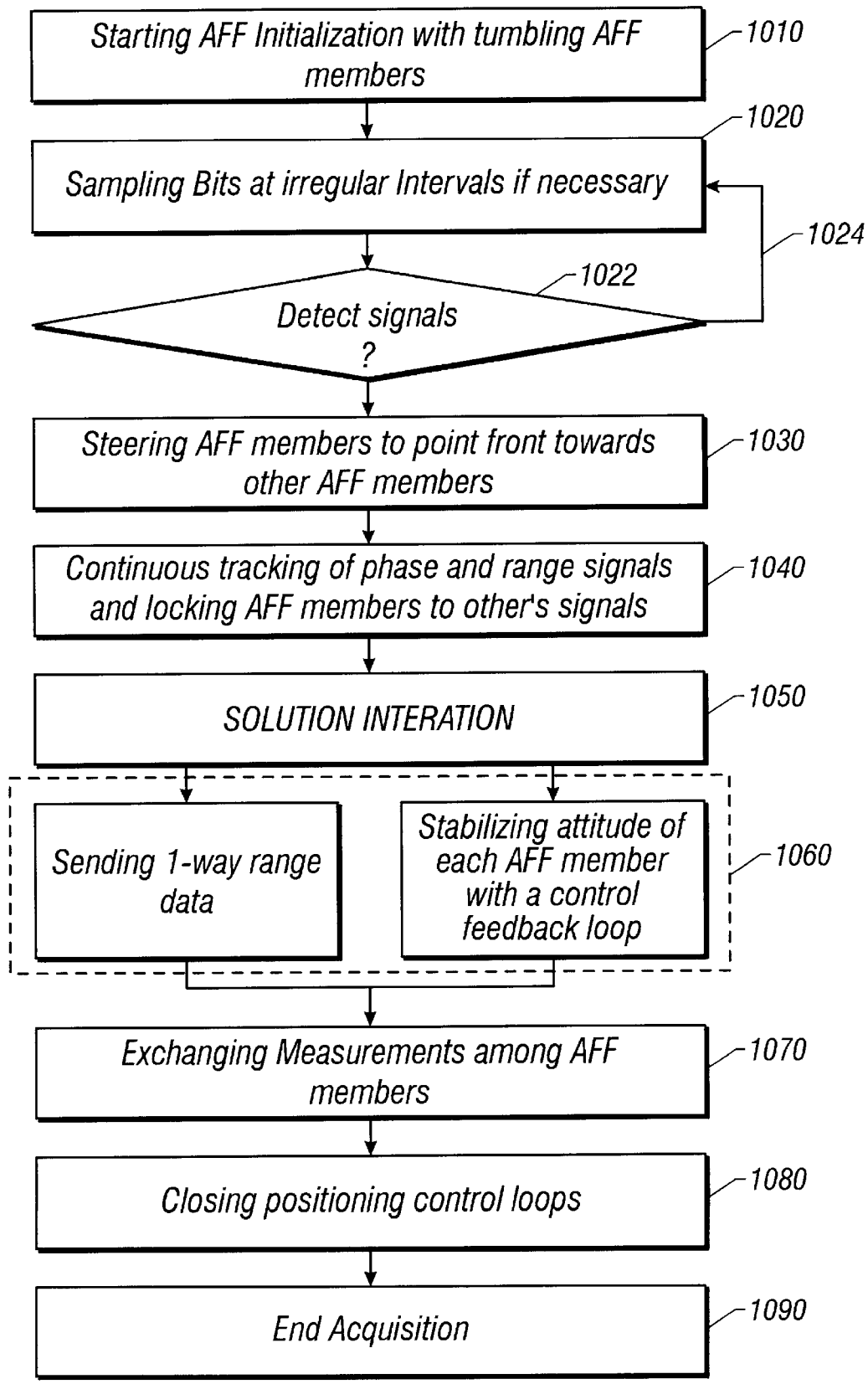
FIG. 10 is a flowchart of one embodiment of AFF initial acquisition.

FIG. 10 shows one embodiment of the AFF initial acquisition. At step 1010, the AFF initial acquisition begins with transmission of bit signals by each AFF member that may be in an irregularly tumbling state. At step 1020, each AFF member searches for signals from other AFF members. If no signal is detected, an AFF member continues to adjust its attitude until a signal is detected (step 1030). At step 1040, an AFF member is steered to search for additional AFF members while maintaining its communication with the members it has previously "seen".

At step 1050, the AFF members face one another so that the tracking of carrier phase and range signals is continuous and the transceivers are locked onto the others's signals. An initial solution may not be in the linear regime (for linear least-squares) and iteration may be needed to converge the solution. This could take a few seconds or less. If actual GPS data are being tracked, the GPS data may be used to expedite the initial solutions and their convergence.

At step 1060, one-way ranges are generated for each leg of the formation by using the continuous ranging data while the attitude of each AFF member is stabilized by attitude feedback control loops.

Next at step 1070, the one-way ranges are exchanged among AFF members and are combined in the central AFF member. Finally, at step 1080, the positioning feedback control loops are activated so that the positions of the AFF members are stabilized: the AFF members no longer have significant drifting relative one another and the distances therebetween are essentially constant and stable. This completes the acquisition of the AFF and the formation can be brought to a desired configuration through a series of attitude and positioning maneuvers.

The AFF sensor may have a number of applications including, but not limited to, formations of spacecraft in separated spacecraft interferometry systems for NASA's Deep Space Mission 3, rendezvous and docking of spacecraft, formation flying in an Earth orbit, aircraft collision avoidance and formation flying, ground robotics vehicles, ship formation and submersible formations. Other NASA separated spacecraft missions that may benefit from the AFF technology include Earth orbiting imaging missions, for example, TOPSAT, and the New Millennium EO-1 (Earth orbiting mission 1) Landsat Co-flyer; gravity mapping missions such as GRACE, deep space sparse-aperture RF telescope such as ALPHA, and MUSIC, a moderately filled aperture interferometer constellation. Many of these missions require moderate to precision formation sensing capabilities.

New Millennium DS-3 Separated Spacecraft Interferometer

Many imaging applications require high resolution. The concept of optical interferometry emerges as a very attractive alternative to the large aperture telescopes for high-resolution imaging. Optical interferometry has several advantages. Optical interferometers can coherently combine the light from several small separated apertures to yield the equivalent angular resolution of a telescope that is as large as their separations. In doing so, interferometers weigh less and cost significantly less than an equivalent filled-aperture telescope. Furthermore, optical interferometers can decouple sensitivity (collecting area) from angular resolution (baseline), thus providing higher angular resolution than what is possible with a telescope with the same sensitivity.

The separated spacecraft interferometry technology has been identified as an important alternative by NASA. SSI in free space, with its extremely long baselines, allows measurements of high precision that is difficult to achieve with other techniques, such as conventional single aperture telescopes and single structure interferometers. Unlike ground interferometers, these long baselines are not subjected to the Earth's curvature. Nor are the observations corrupted by Earth's atmospheric effects. Furthermore, SSI allows baseline lengths and orientations to change easily. It also permits incremental array expansions and replenishment.

The new challenge to the SSI concept is to provide a "virtual" structure in order to maintain the necessary structural rigidity. The solutions can be provided by three parts: active optics are used to control at high frequencies, and at small scale; a laser metrology system is used to provide the measurements for the active optics; and Formation Flying is performed to do low frequency, large scale control.

Figure 11:
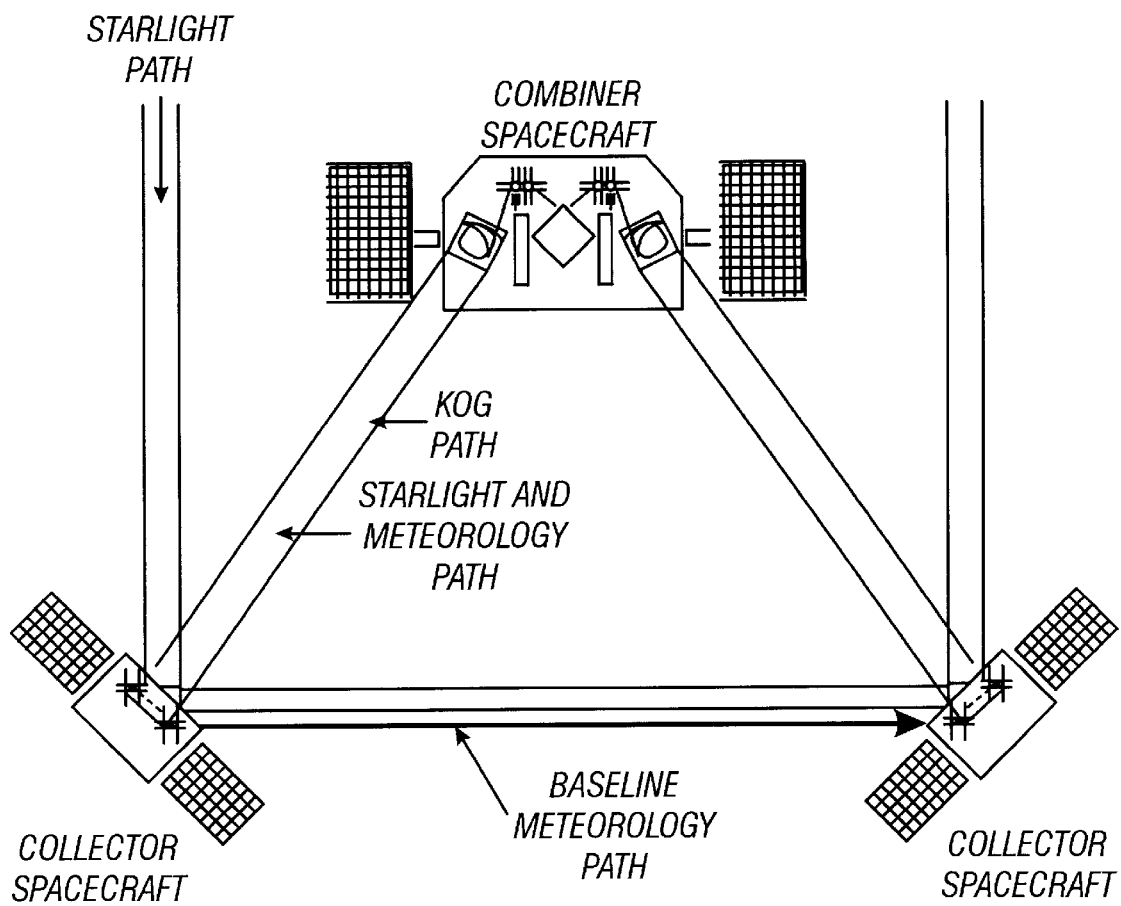
FIG. 11 is a schematic illustration of the separated spacecraft optical interferometer in Deep Space Mission 3.

A separated-spacecraft optical interferometer is illustrated in FIG. 11. The interferometer instrument can be distributed over three small spacecraft: two spacecraft may serve as collectors and respectively direct starlight toward a third spacecraft. The third spacecraft in turn can combine the light signals from the two collectors and perform the interferometric detection. The mission may nominally be deployed in a low-disturbance heliocentric orbit to minimize stationkeeping fuel burden. The interferometer baselines may be variable from about 100 m to about 1 km. Low-bandwidth corrections approximately for 1 cm and 1 arc-minute station-keeping and relative attitude errors may be accomplished by spacecraft control with an electric-propulsion or a cold-gas system; high-bandwidth corrections for about 10 nanometers and 0.05 arcsecond station-keeping and relative attitude errors may be accomplished by active optical controls.

The DS-3 mission is for use in interplanetary space at a distance of about 0.1 AU which is well beyond the coverage of the NAVSTAR GPS constellation, thus deployment and coarse relative station-keeping may be monitored with the AFF system of the present invention. Laser metrology among the three spacecraft may be used to measure more precise relative motions of the three spacecraft. Determination of rotation of the constellation as a whole may use a kilometric optical gyro (KOG), which is a free space ring laser gyro that uses counter propagating laser beams among the three spacecraft to measure rotation with a high accuracy.

The AFF operations shown in FIGS. 9 and 10 can be applied to the DS-3 separated spacecraft interferometer. Due to the special operating environment, some modifications may be implemented.

Figure 12:
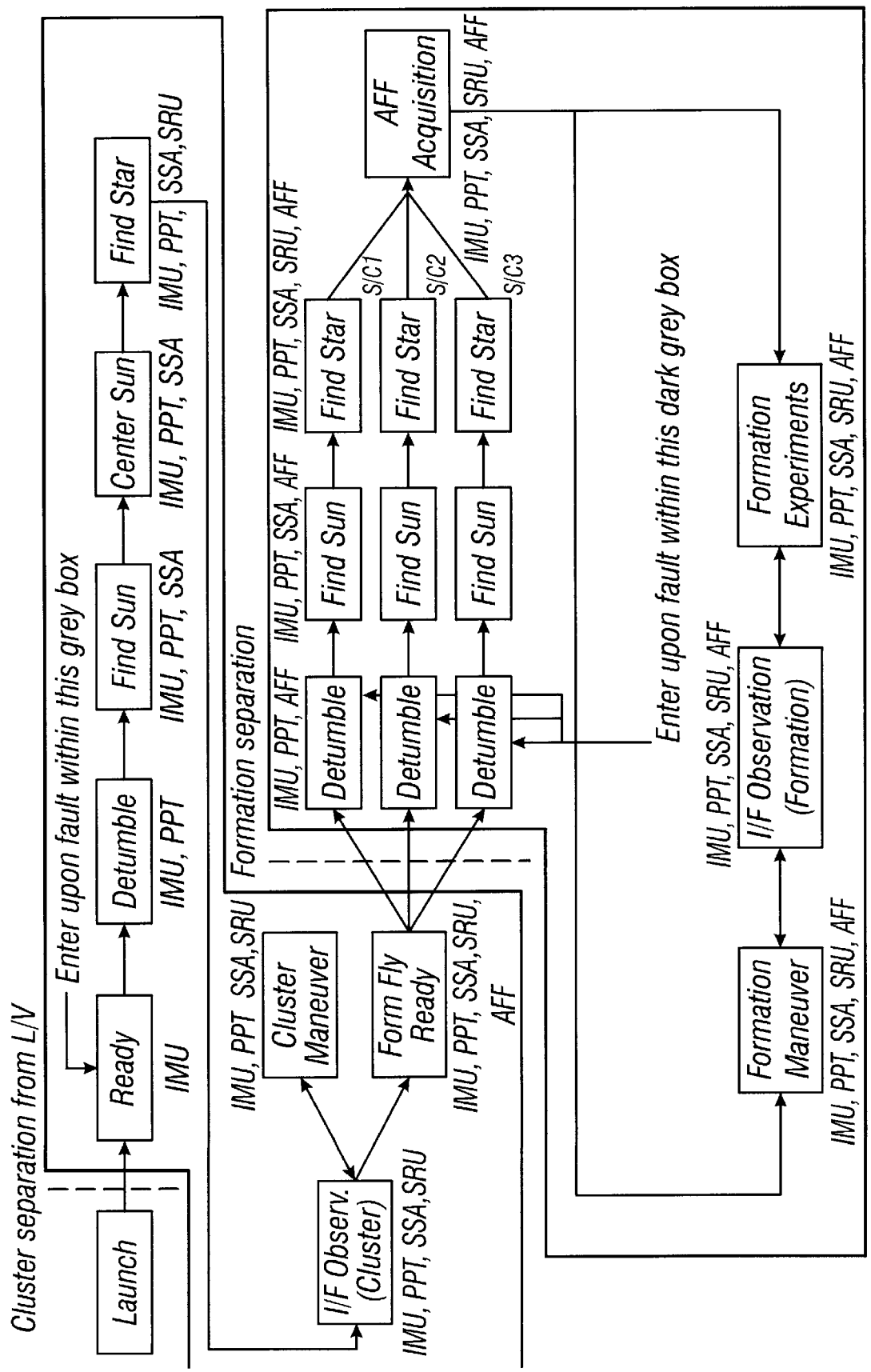
FIG. 12 is a flowchart showing an AFF operation for deep space applications.

For example, one embodiment of AFF operation in deep space is illustrated in FIG. 12. The operation includes: launching the cluster of space vehicles, initialization of the cluster, AFF initial acquisition, formation maneuver and performing experiments. In initialization of the cluster, the sun and a reference star are used to adjust the attitude of the cluster at a desired position and orientation as a single unit in the space. Next, the space vehicles in the cluster are separated from one another and reorientate themselves with respect the sun and the same reference star. This completes the preparation for the AFF initial acquisition. FIG. 12 shows a cluster of three space vehicles. At any point, the space vehicles would reorientate themselves against the sun and the reference star for another AFF initial acquisition if a fault occurs during formation maneuver or performing experiments.

Figure 13:
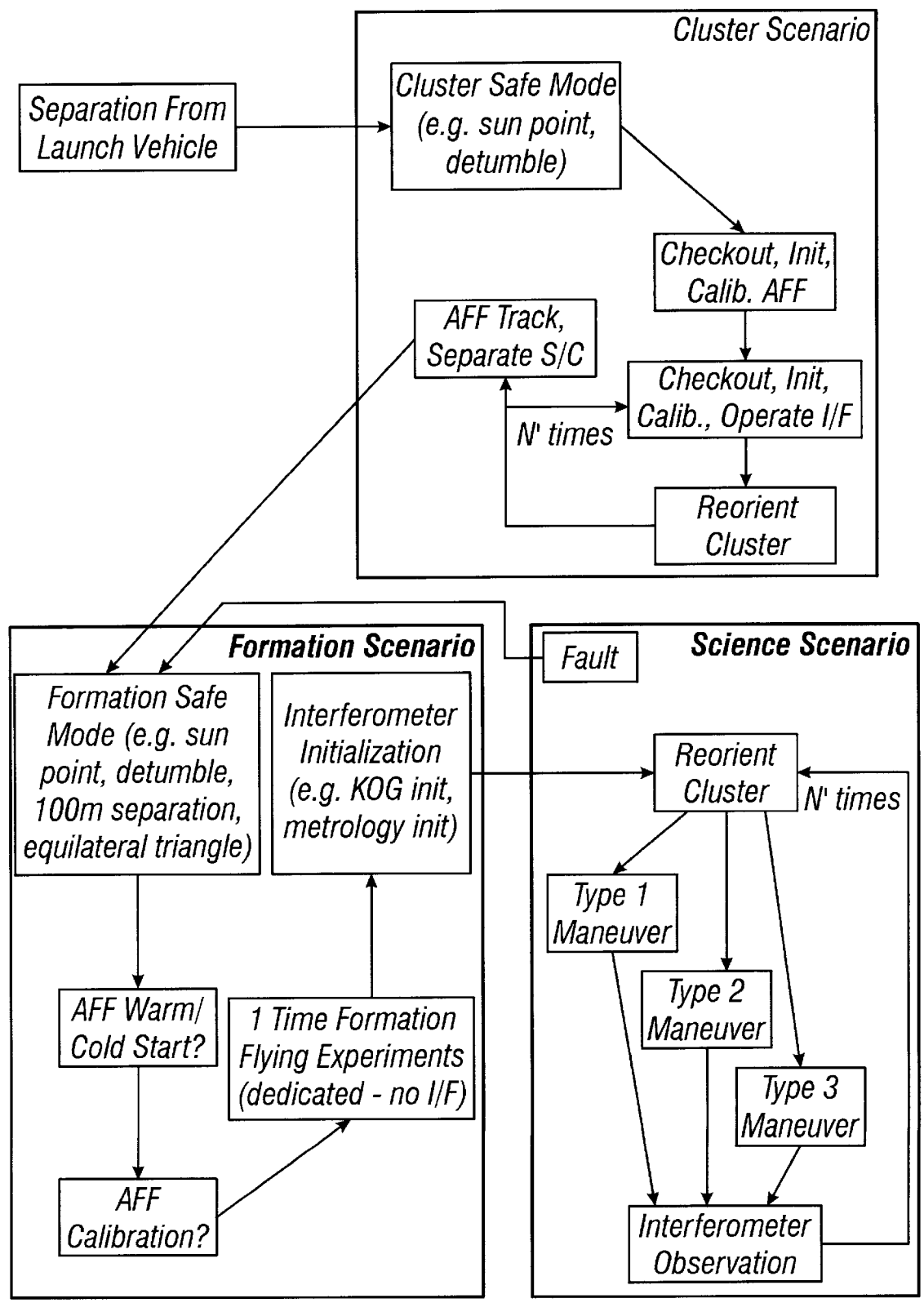
FIG. 13 is a flowchart showing another AFF operation for deep space applications.

FIG. 13 further shows an embodiment with additional implementation details of the four operation stages in a DS-3 AFF mission.

Applicability to DS-3 Objectives

The AFF of the present invention may be used to produce significant reduction in life-cycle costs, spacecraft mass and complexity for missions requiring precise relative positioning and orientation of multiple spacecraft. Once an AFF based spacecraft formation is launched, the operational costs on the ground may essentially be eliminated for maintenance of the desired spacecraft formation configuration. This is indeed a revolutionary change from existing operations concepts, where major expenditures are currently required to acquire, process, and analyze data from any mission, and then to command the spacecraft to the desired positions and orientations. Those traditional methods may become infeasible for ensembles of 2 to 16 (or more) spacecraft designed for very low-cost operations in the New Millennium Program. The AFF system of the invention may be used to replace the traditional systems and enable multiple spacecraft missions to be operated at a small fraction of the current operations costs.

The original concept for constellation initialization consisted of three types of metrology systems used in successive field of view (FOV) versus accuracy levels. A radio-frequency (RF) ranging system may be used as a coarse acquisition sensor at an accuracy on the orders of meters. Even though this system may have a fairly large FOV, a sequence of search maneuvers may still be required. Then an optical beaconing system may be used as an intermediate acquisition sensor to increase the accuracy to centimeter levels and to provide relative orientation information. Finally, a laser metrology system can be used to provide fine ranging information between spacecraft. However, the FOV of this system is limited. By using the AFF, the RF and the optical beaconing systems can be combined into one all-inclusive sensor.

Other savings in cost and mass, at least for the DS-3, may be realized from the potential elimination of star-tracking sensors from two of the three spacecraft for that mission. At least one star tracker is still needed to calibrate the absolute, or inertial, orientation of the spacecraft. Fuel mass may also be reduced since the AFF is can have a $4\pi$-steradian coverage, thus eliminating search maneuvers. Additionally, other cost savings likely to be realized on the DS-3 from the 1 cm level of positioning accuracy can be the elimination of at least one type of metrology system which would otherwise be required to reach the 1 cm accuracy level.

The AFF development will benefit from parallel efforts, some of which are supported by the NMP, to develop a "GPS-on-a-chip" receiver capability in which all circuits are integrated on a single chip. Such technology can be applicable to the AFF as well, thus further lowering the mass and power estimates given above.

The AFF system of the invention may be used to significantly improve the accuracy and performance for relative positioning and attitude determination. Traditional ground-based systems are about several orders of magnitude too noisy and too expensive to provide the required information, at least for the DS-3. Alternative methods using spaceborne laser tracking or star sensors are probably competitive in performance but will likely increase system complexity and cost. In addition, if the spacecraft are separated by more than a few kilometers, power requirements for an optical system would need to be large in order to provide light spreading over a large field of view.

Other AFF Applications

The AFF may also be used as a rendezvous and docking sensor for space missions, airborne applications, or terrestrial applications. Two vehicles to be attached together can be equipped with an AFF sensing system. A desired formation configuration would require two vehicles in physical contact with each other with a certain relative positioning and attitude. One or more preliminary configurations may be implemented in the process so that the two vehicles are first brought close to each other at a preliminary configuration. This allows final vehicle maneuvers to achieve the desired configuration.

One variation of the above application is to use the AFF sensing system one vehicle to locate and intercept another vehicle.

Using the AFF capabilities, a sample-return spacecraft may rendezvous and dock with a "mother" spacecraft so that soil samples could be transferred and returned back to Earth. Such system may be used for Mars sample return and Mars accent vehicle, and the NASA New Millennium DS-4 mission which may include a comet rendezvous and sample return.

Another rendezvous and docking application can be exemplified by the Space Shuttle docking with the Space Station. Because of the Station's large structural elements (solar arrays, strut structures, etc.), the Shuttle-to-GPS line-of-sight may be blocked. An AFF implemented in the existing Shuttle GPS receiver may be considered by some to be more capable and elegant than those provided by the currently planned optical based docking sensors.

The applications of the AFF for Earth based applications are of great potential. The concept can also be extended underwater, providing the appropriate sonar frequencies are used.

Another variation of the invention is that at least one of the formation member may be only equipped with one or more transmitting antennas. Thus, this transmitting member is "passive" in a sense that it cannot monitor other AFF members but its position and attitude are monitored by other AFF members and the AFF sensing system. Furthermore, the position and attitude of this passive transmitting member can be controlled by the AFF sensing system. Such an AFF formation may be used in landing a vehicle at a desired location. For example, this system may be used in a Mars landing of a robotic vehicle.

Although the present invention has been described in detail with reference to a few embodiments, one ordinarily skilled in the art to which this invention pertains will appreciate that various modifications and enhancements may be made without departing from the spirit and scope of the following claims.

What is claimed is:

1. A formation sensing system for a formation having a plurality of formation members, comprising:
    a plurality of antennas disposed on each formation member to receive and transmit transmission signals with other formation members that are indicative of relative positioning and attitude information of the formation members; and
    a transceiver located on each formation member and connected to said antennas, said transceiver having a down-conversion assembly operable to demodulate received transmission signals from other formation members, a signal processor operable to process the received signals and generate data indicative of the relative positioning and attitude information without reference to an external signal outside the formation members, and an up-conversion assembly operable to use a ranging code to produce a transmission signal to other formation members,
    wherein transceivers of any two communicating formation members are configured to process respective transmission signals from each other to determine a clock offset and a distance between the two transceivers, without synchronization to a clock signal.

2. A system as in claim 1, wherein said ranging code comprises a GPS ranging code and signal processor is operable to generate the data indicative of the relative positioning and attitude information in absence of GPS signals from GPS satellites.

3. A system as in claim 1, wherein said ranging code comprises a non-GPS ranging code.

4. A system as in claim 3, wherein said non-GPS ranging code is generated based on a pseudo-random noise code.

5. A system as in claim 3, wherein said non-GPS ranging code is generated based on a spaced ranging tone scheme.

6. A system as in claim 1, wherein said signal processor is configured to superimpose additional information onto said transmission signal, said additional information including at least one of the group consisting of telemetry, control commands, scientific and engineering data.

7. A system as in claim 1, wherein said antennas are arranged to form a three dimensional antenna array which has a field-of-view of about $4\pi$ steradian.

8. A system as in claim 1, wherein said down-conversion assembly includes a signal mixer, a low-pass filter, and a signal amplifier.

9. A system as in claim 1, wherein said up-conversion assembly includes a first signal mixer that encodes said data from said signal processor according to said ranging code and a second signal mixer to superimpose said data onto a high-frequency signal carrier.

10. A system as in claim 8, further comprising a reference oscillator producing a frequency reference signal and wherein said high-frequency signal has a frequency offset with respect to said frequency reference signal.

11. A system as in claim 1, wherein said signal processor comprises a GPS receiver processor.

12. A system as in claim 1, wherein said signal processor includes a CPU that produces said data and a plurality of application-specific integrated circuits with at least one of which being configured to produce said ranging code.

13. A method of initiating and autonomously maintaining a formation of a plurality formation members, comprising:
    adjusting orientation of each formation member to establish initial communication links among formation members;
    using coded ranging radio signals to exchange phase and range data among formation members;
    determining a clock offset between any two communicating formation in absence of a synchronization signal to compute a distance therebetween;
    producing a measured formation configuration by computing relative positioning and orientation of the formation according to said phase and range data without a reference to an external reference signal outside the formation; and
    comparing said measured formation configuration with a desired formation configuration to determine a difference therebetween.

14. A method as in claim 13, wherein said phase and range data are indicative of a GPS model.

15. A method as in claim 13, wherein said phase and range data are generated based on a non-GPS split spectrum scheme.

16. A method as in claim 13, further comprising repeating the exchange of the phase and range data from one formation member to others to monitor and maintain a formation configuration according to the desired formation configuration.

17. A method as in claim 13, further comprising repeating said adjusting orientation of each formation member to establish said initial communication links when the formation configuration is disrupted.

18. A method as in claim 13, further comprising generating maneuver instructions operable to minimize said difference by maneuvering at least one formation member.

19. A method of maintaining a formation having at least two formation members, comprising:

using at least two antennas in one formation member to receive transmision signals from another formation member to determine an attitude of the one formation member relative to the other formation member without a reference external to the formation;

processing a transmission signal from the one formation member to the other in a relation with another transmission signal from the other formation member to the one formation member to determine a clock offset between the two formation members based on a ranging code in the transmission signals without a synchronization clock signal; and using the clock offset to determine a distance between the two formation members according to a time delay of signal transmission between the two formation members.

20. A method as in claim 19, wherein the ranging code comprises pulses of a temporal sequence and is used to determine a distance between two formation members.

21. A method as in claim 19, wherein the ranging code includes a pseudo-randon noise code which is used to determine a distance between two formation members.

22. A method as in claim 19, wherein the ranging code includes tones at different frequencies and is used to determine a distance between two formation members.

23. A method as in claim 19, further comprising:

comparing relative positioning and attitude of the two formation members to desired relative positioning and attitude to determine a deviation therebetween; and adjusting at least one formation member to reduce the deviation.

* * * * *